(12) United States Patent
Kishi

(10) Patent No.: US 8,326,039 B2
(45) Date of Patent: Dec. 4, 2012

(54) IMAGE PROCESSING APPARATUS, IMAGE PROCESSING METHOD, AND RECORDING MEDIUM

(75) Inventor: Hiroki Kishi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1105 days.

(21) Appl. No.: 12/197,676

(22) Filed: Aug. 25, 2008

(65) Prior Publication Data

US 2009/0074302 A1 Mar. 19, 2009

(30) Foreign Application Priority Data

Sep. 13, 2007 (JP) .................................. 2007-238386

(51) Int. Cl.
*G06K 9/18* (2006.01)
(52) U.S. Cl. ........................................................ 382/185
(58) Field of Classification Search ........................ None
See application file for complete search history.

(56) References Cited

U.S. PATENT DOCUMENTS

| | | | |
|---|---|---|---|
| 5,878,161 A | 3/1999 | Ishida et al. | 382/198 |
| 6,185,341 B1 | 2/2001 | Ishida et al. | 382/266 |
| 6,232,987 B1 | 5/2001 | Choi et al. | |
| 6,404,921 B1 | 6/2002 | Ishida | 382/197 |
| 7,251,365 B2 * | 7/2007 | Fux et al. | 382/185 |
| 2005/0238244 A1 | 10/2005 | Uzawa | 382/242 |

FOREIGN PATENT DOCUMENTS

| | | |
|---|---|---|
| CN | 1172991 A | 2/1998 |
| JP | 5-314271 A | 11/1993 |
| JP | 5-328144 A | 12/1993 |
| JP | 6-282658 A | 10/1994 |
| JP | 2845107 | 10/1998 |
| JP | 3026592 | 1/2000 |
| JP | 3049672 | 3/2000 |
| JP | 2005-346137 | 12/2005 |

OTHER PUBLICATIONS

Japanese Office Action dated Jan. 27, 2012 in counterpart Japanese Application No. 2007-238386.
The State Intellectual Property Office of the People's Republic of China, First Office Action in Application No. 200810149575.4 mailed on May 21, 2010 (along with partial translation).

* cited by examiner

*Primary Examiner* — Claire X Wang
(74) *Attorney, Agent, or Firm* — Fitzpatrick, Cella, Harper & Scinto

(57) ABSTRACT

An image processing apparatus of this invention includes a classification unit configured to classify anchor points that define the contour of an object into a plurality of groups based on features of the contour of the object, and a saving unit configured to identifiably save the anchor points classified by the classification unit for respective groups.

19 Claims, 12 Drawing Sheets

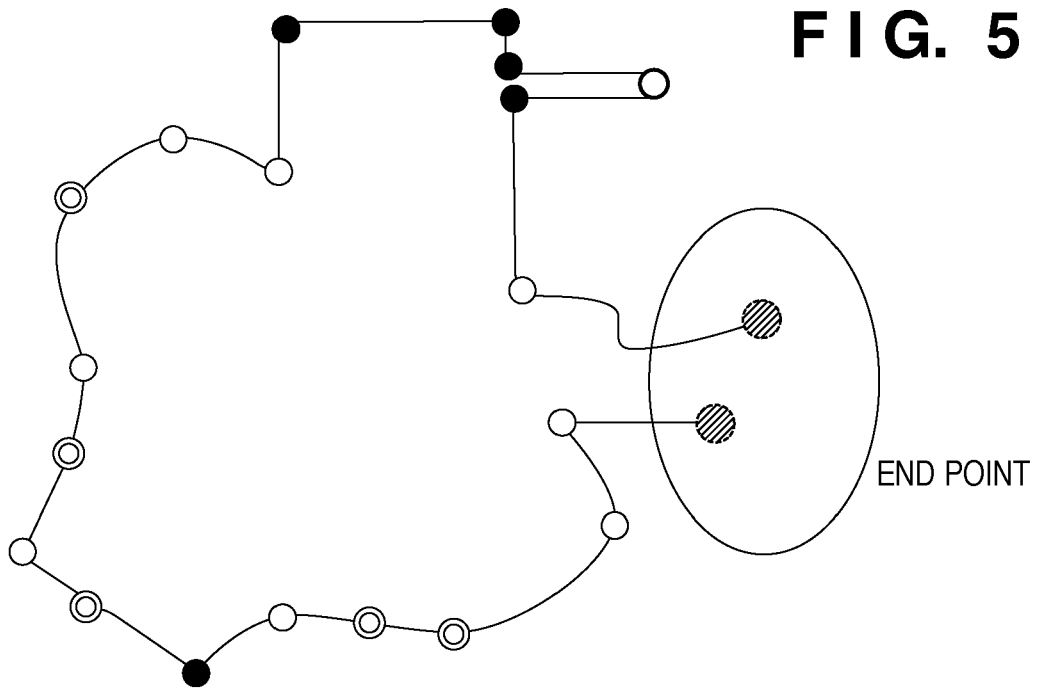
FIG. 5
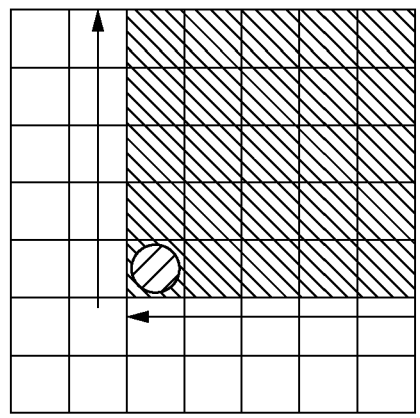
FIG. 6A
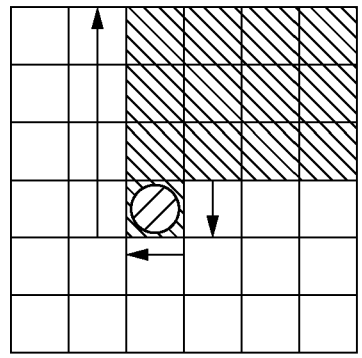
FIG. 6B

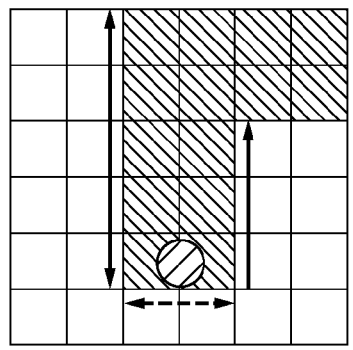
FIG. 7A
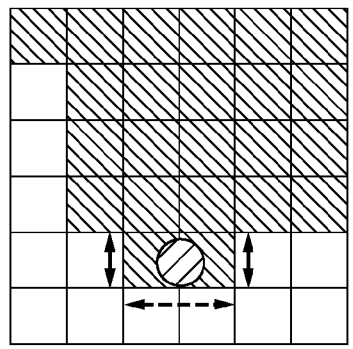
FIG. 7B
⊘ : ANCHOR POINT OF INTEREST
--- : TARGET SIDE
— : ADJACENT SIDE
FIG. 8
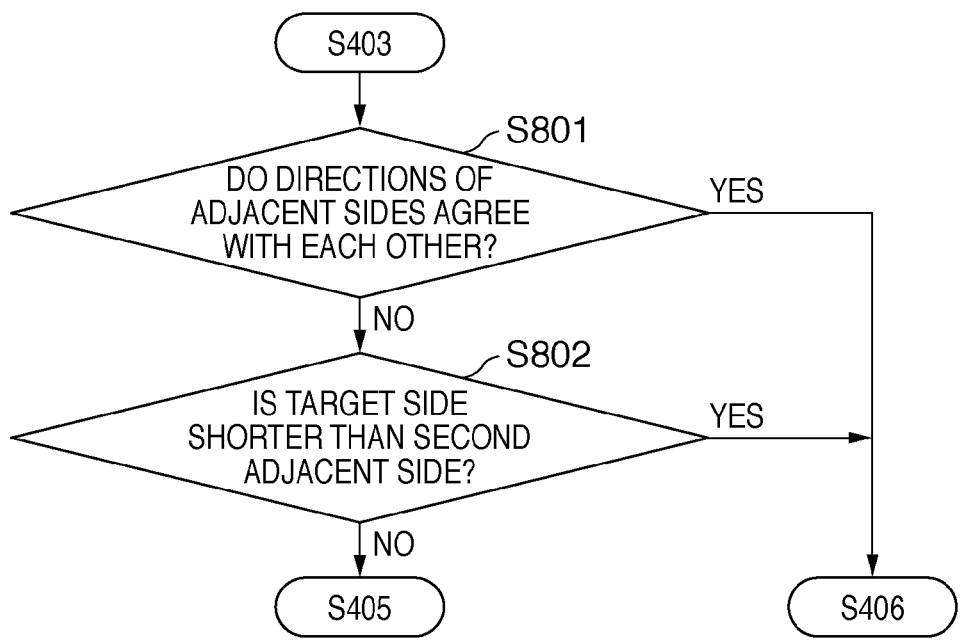

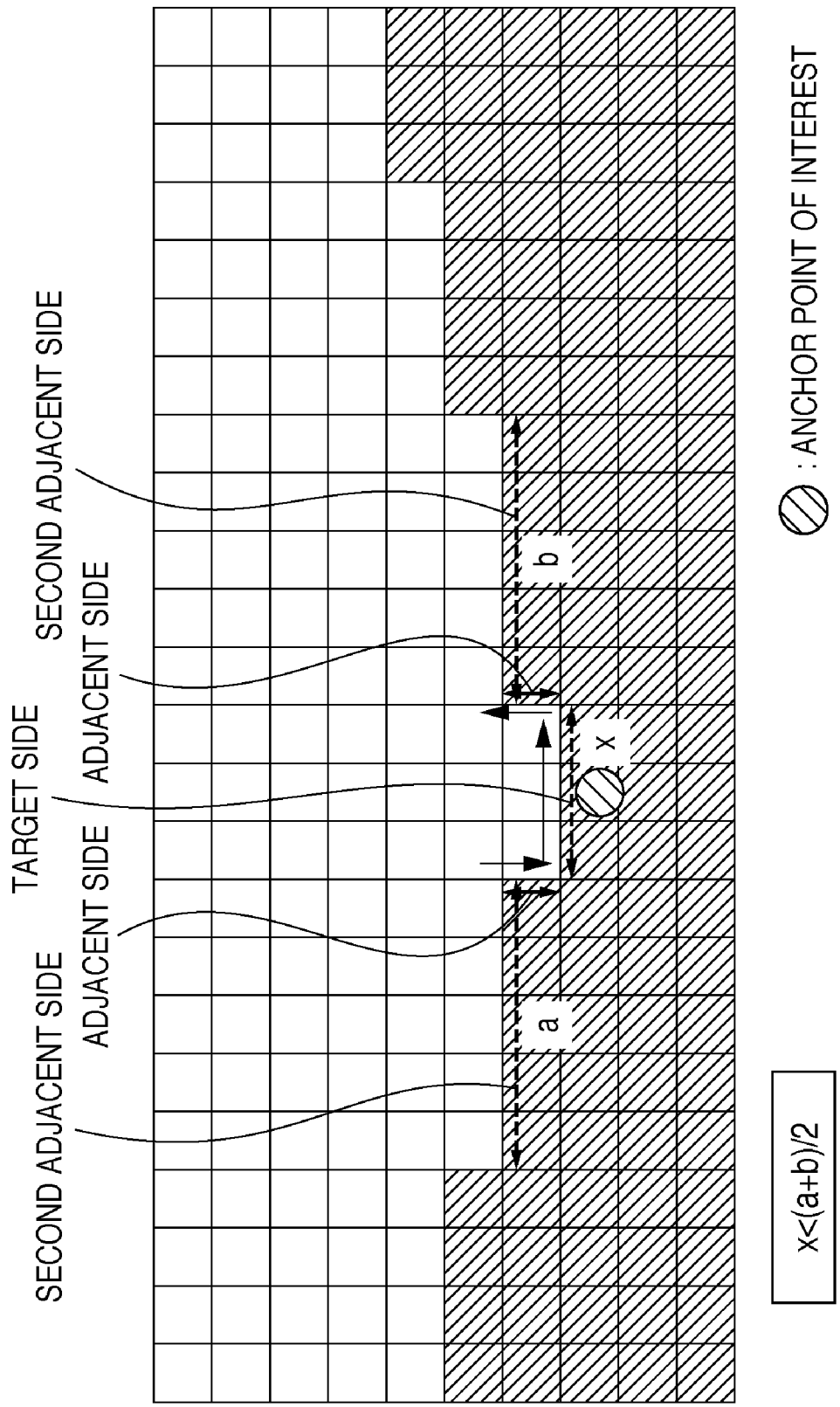

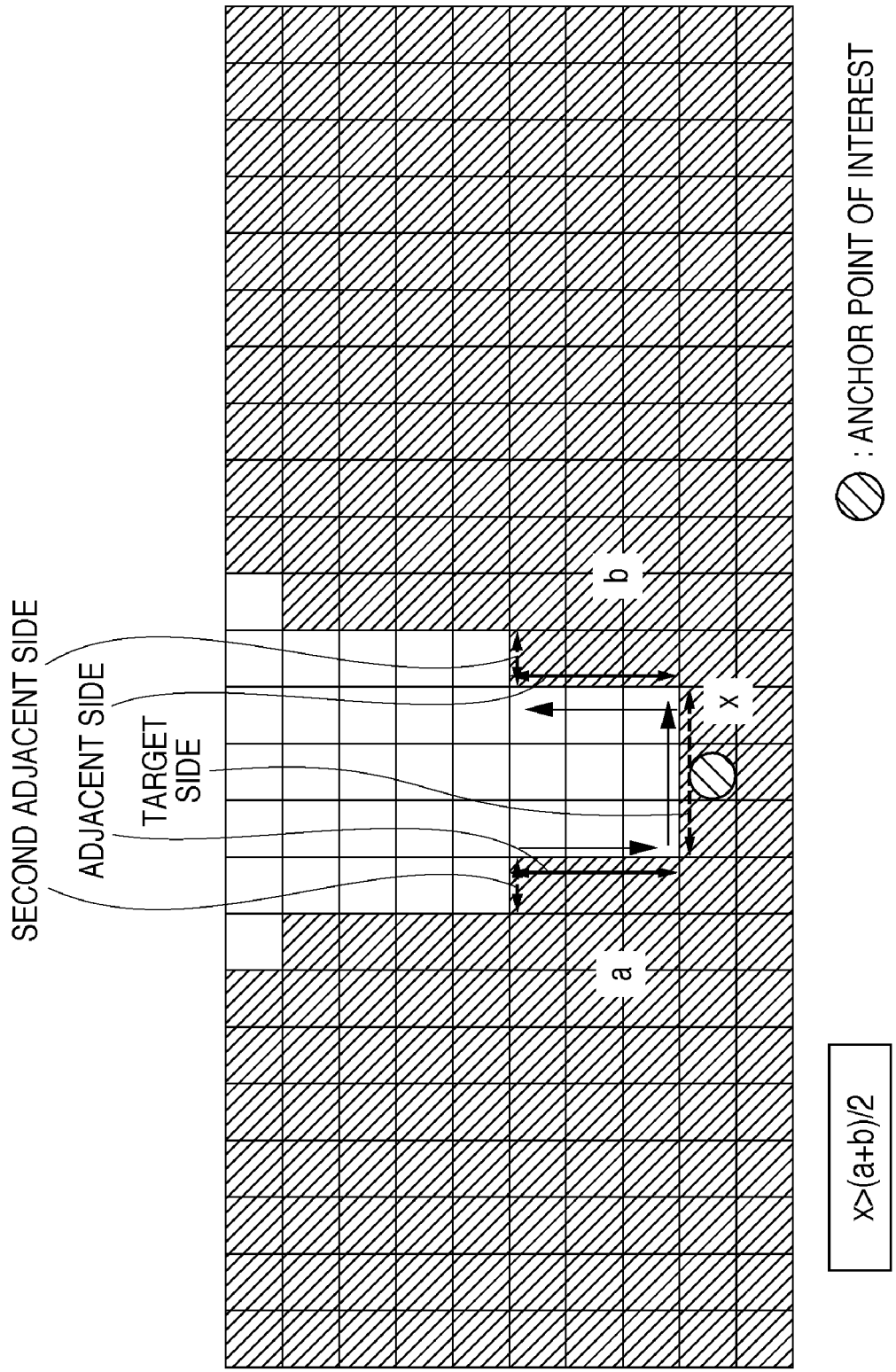

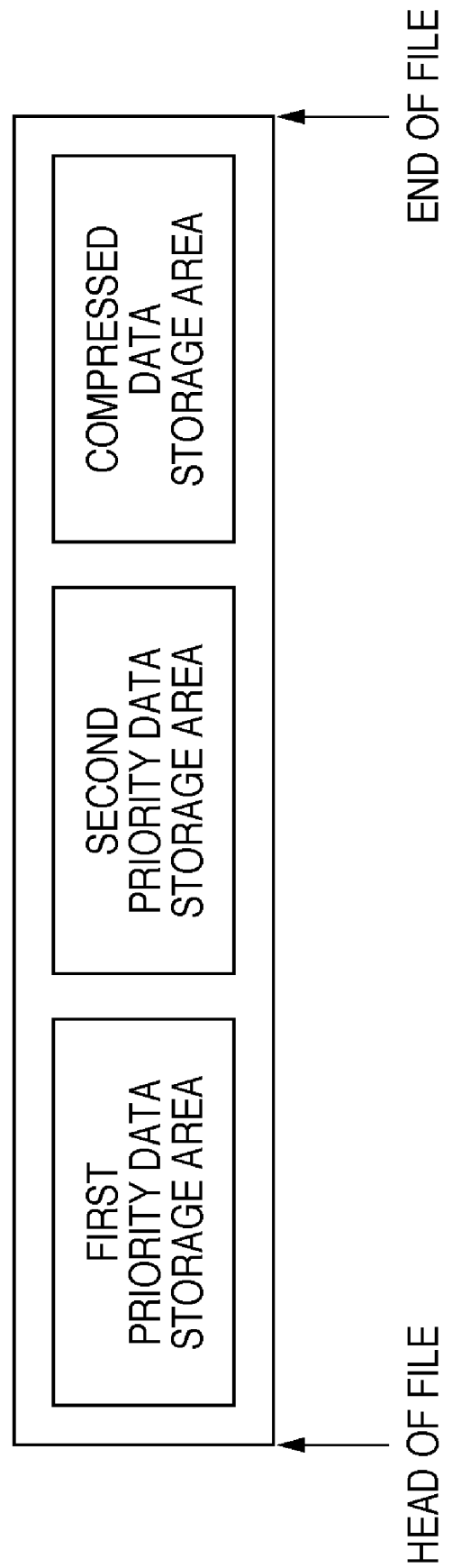

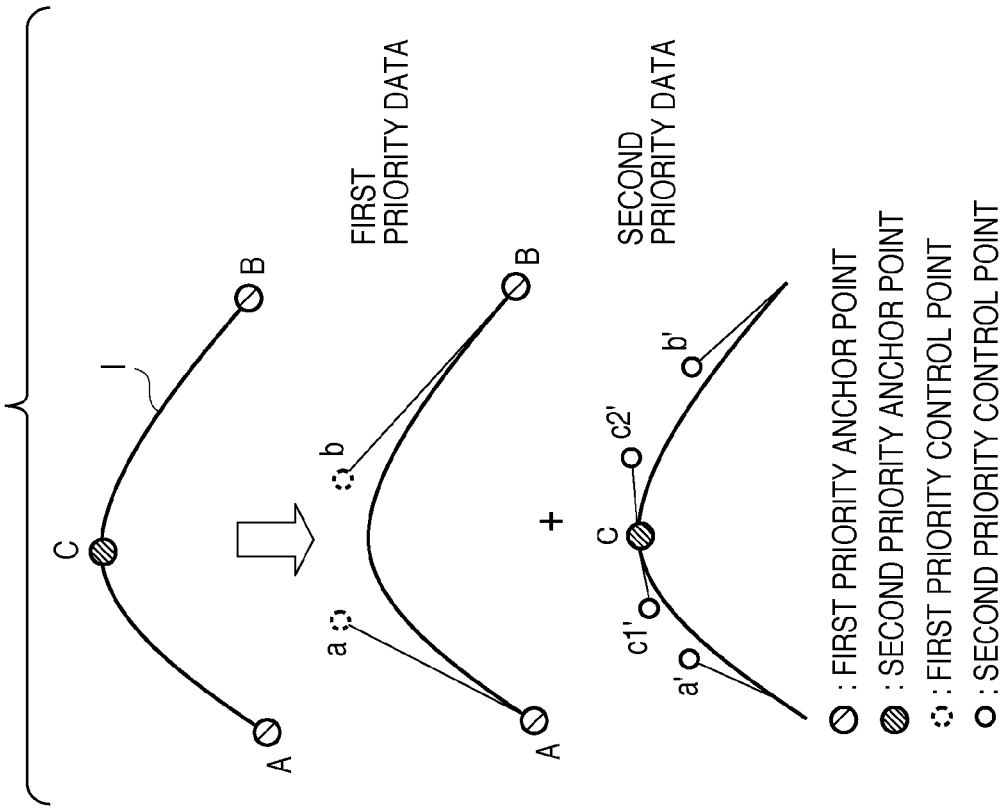
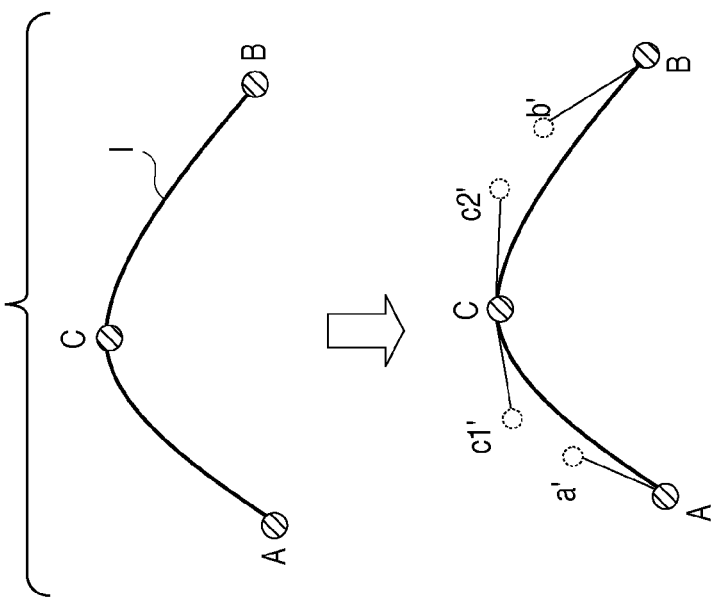

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus for processing an externally input image, image processing method and recording medium. And, more particularly, the present invention relates to an apparatus for vectorizing an illustrative image.

2. Description of the Related Art

Conventionally, a vectorization technique for fonts (character type faces) used in a wordprocessor or the like has prevailed. The conventional vectorization technique for fonts (character type faces) targets at inputs of characters which are beautifully designed in advance. This technique digitizes one character created in an analog manner to a binary image having a relatively large size of 512×512 pixels, 1024×1024 pixels, or the like, and vectorizes the edge or contour of the character based on the digitized data. Basically, since the data which is vectorized in this way allows smooth edge expression if it is enlarged to various desired sizes, it has a feature of high shape quality. Since characters of various sizes can be generated based on single data, vectorization of data can improve convenience and can reduce the data volume.

Therefore, as disclosed in Japanese Patent No. 3049672, the vectorization technique has been widely proposed not only for fonts (character type faces) but also for binary images, thus obtaining the aforementioned effects.

In recent years, as described in Japanese Patent No. 2845107, a vectorization technique of a scanned image including a full-color part has also been proposed.

Vectorization of binary images is also described in Japanese Patent No. 3026592. As described in this reference, the vectorization method functions as follows. That is, a predetermined position is set as a point that forms a contour line based on the states of a pixel of interest and its adjacent pixels, and a connection direction of points that form the contour line is determined based on the states of adjacent pixels. Furthermore, a connection state between a point that forms the contour line and another point that forms the contour line is checked, the position of a pixel of interest is updated on image data in a raster scan order, and contour points are extracted based on the states of adjacent pixels for each pixel of interest. In this arrangement, the states of a pixel of interest and its adjacent pixels in image data are held, the pixel of interest is extracted in the raster scan order, and inter-pixel vectors in the horizontal and vertical directions are detected based on the states of the pixel of interest and adjacent pixels. The connection state of the inter-pixel vectors is determined, and the contour of image data is extracted based on the determined connection state of the inter-pixel vectors. The method described in this reference can extract all contour lines in an image by only one raster scan order, and does not require any image memory used to store all image data. As a result, the memory capacity can be reduced, and the contours can be extracted from borders of pixels in place of the central positions of pixels of an input image, thus allowing extraction of a contour line having a significant width even for a thin line having a one-pixel width.

As described in Japanese Patent Laid-Open No. 2005-346137, by approximating contour information of a binary image by not only lines but also quadratic or cubic Bezier curves, the contour information that expresses a variable-scale image with high image quality can be functionally approximated to have a smaller data size.

However, in the aforementioned conventional image vectorization technique, upon storing vectorized data, the data are stored in turn top down of an image. Therefore, when only data indicating features of an object as a target are extracted from high-precision image data to render a sketch of the entire image, the processing becomes complicated.

SUMMARY OF THE INVENTION

The present invention provides an image processing apparatus which can easily render a sketch (a rough contour) of an object by classifying data having features of shapes of an object to be vectorized.

The present invention in its first aspect provides an image processing apparatus, which generates image data by functionally approximating a contour of an object using anchor points and control points, and processes the image data, comprising:

a classification unit configured to classify the anchor points that define the contour of the object into a plurality of groups based on features of the contour of the object; and a saving unit configured to identifiably save the anchor points classified by the classification unit for respective groups.

The present invention in its second aspect provides an image processing method, which generates image data by functionally approximating a contour of an object using anchor points and control points, and processes the image data, comprising:

a classification step of classifying the anchor points that define the contour of the object into a plurality of groups based on features of the contour of the object; and a saving step of identifiably saving the anchor points classified in the classification step for respective groups.

The present invention in its third aspect provides a computer-readable recording medium recording an image processing program, which generates image data by functionally approximating a contour of an object using anchor points and control points, and processes the image data, the program making a computer function to:

classify the anchor points that define the contour of the object into a plurality of groups based on features of the contour of the object; and identifiably save the classified anchor points for respective groups.

According to the present invention, a sketch of an object can be easily rendered by classifying data having features of shapes of an object to be vectorized.

Further features of the present invention will become apparent from the following description of exemplary embodiments with reference to the attached drawings.

BRIEF DESCRIPTION OF THE DRAWINGS

FIG. 5 is a view for explaining a method of determining an anchor point as an end point;

FIG. 6A is a view for explaining a method of determining an anchor point of interest as a corner point;

FIG. 6B is another view for explaining a method of determining an anchor point of interest as a corner point;

FIG. 7A is a view for explaining a method of determining an anchor point of interest as a protruding point;

FIG. 7B is another view for explaining a method of determining an anchor point of interest as a protruding point;

FIG. 8 is a flowchart for explaining a method of determining an anchor point of interest as a large-curvature point;

FIG. 10 is a view for explaining comparison between the lengths of a target side and second adjacent sides;

FIG. 11 is another view for explaining comparison between the lengths of a target side and second adjacent sides;

FIG. 12 is a view showing the data configuration of a file generated by a file configuration unit;

FIG. 13A is a view showing anchor points to be classified and attached control points;

FIG. 13B is another view showing anchor points to be classified and attached control points.

DESCRIPTION OF THE EMBODIMENTS

Figure 1:
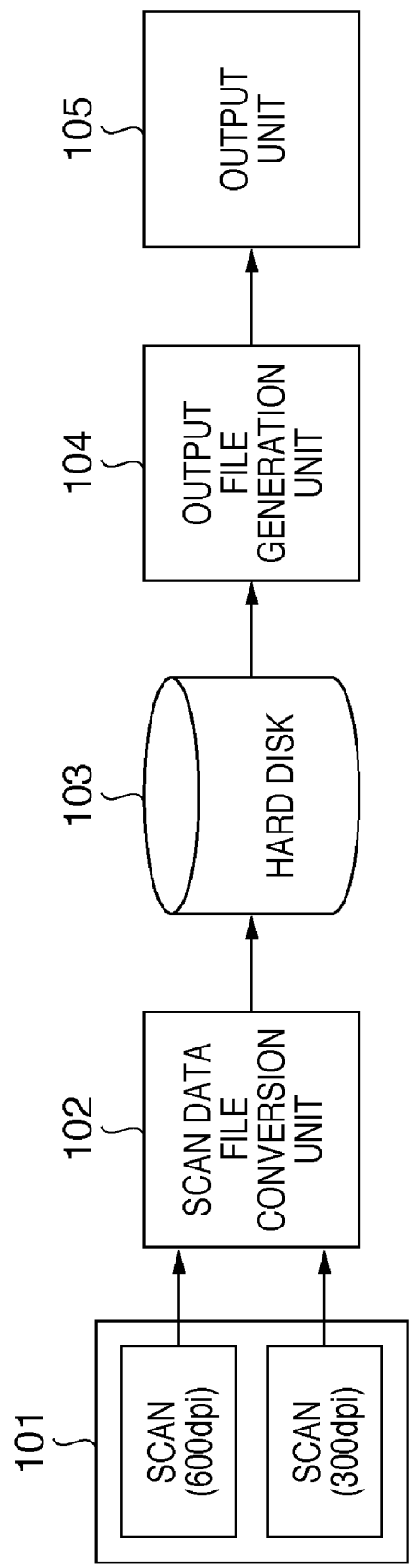
FIG. 1 is a block diagram showing functional blocks of an image processing apparatus according to an embodiment of the present invention.

The best mode of carrying out the present invention will be described in detail hereinafter with reference to the drawings. Note that the same reference numerals denote the same components, and a repetitive description thereof will be avoided.

FIG. 1 is a block diagram showing functional blocks of an image processing apparatus according to an embodiment of the present invention. In this embodiment, an image processing apparatus is an MFP (Multi Function Peripheral) which implements a plurality of different types of functions, and can execute, for example, a copy function, print function, send function, and the like. As shown in FIG. 1, this image processing apparatus includes a scan unit 101, scan data file conversion unit 102, hard disk 103, output file generation unit 104, and output unit 105.

Figure 2:
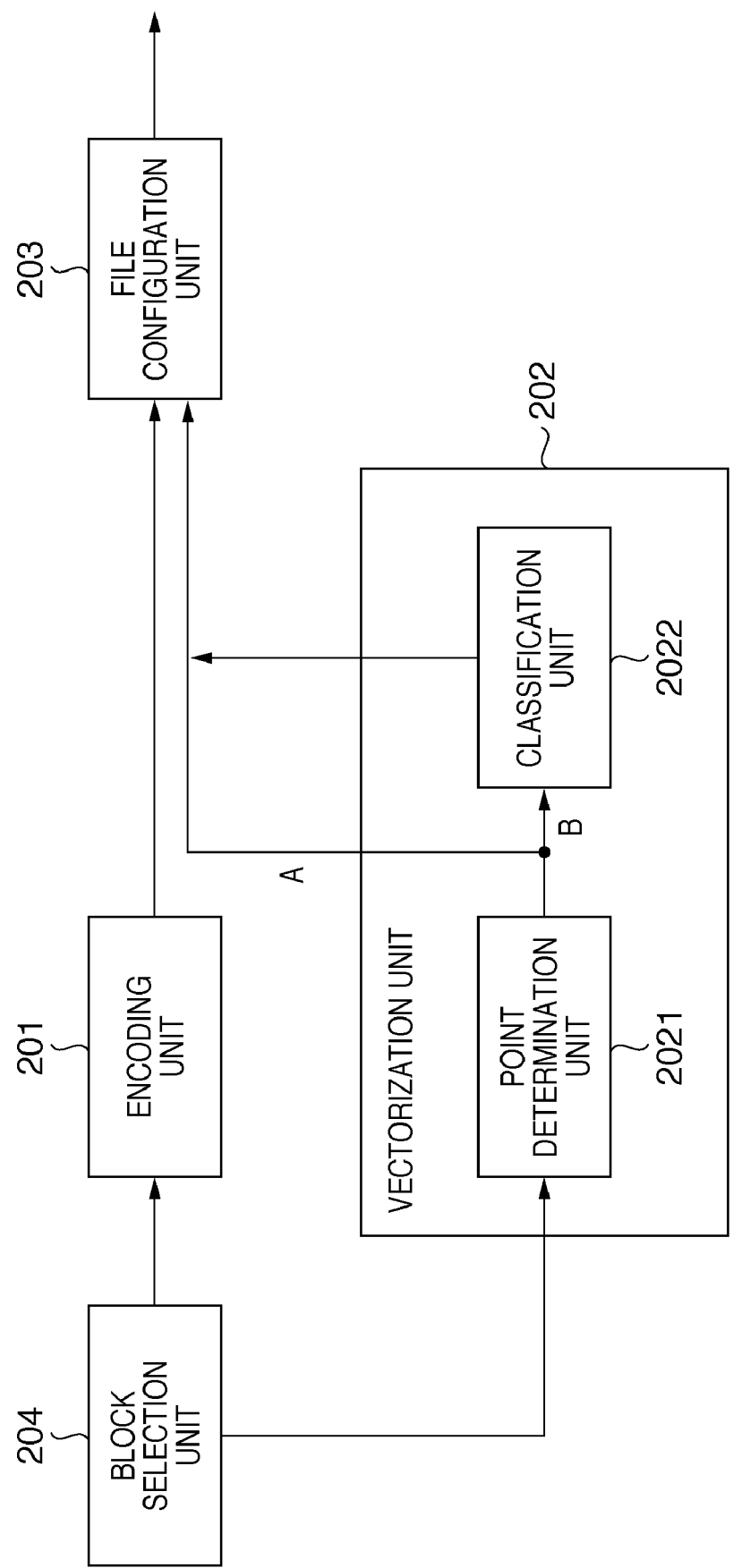
FIG. 2 is a block diagram showing blocks of a scan data file conversion unit shown in FIG. 1.

FIG. 2 is a block diagram showing blocks of the scan data file conversion unit shown in FIG. 1. As shown in FIG. 2, the scan data file conversion unit 102 includes an encoding unit 201, vectorization unit 202, file configuration unit 203, and block selection unit 204. The vectorization unit 202 includes a point determination unit 2021 and classification unit 2022.

This image processing apparatus can execute a copy function and send function. This image processing apparatus converts scan data into a file, and can store the file in an internal hard disk or can send it to a PC or the like by the send function. In this embodiment, this image processing apparatus scans an image at a resolution of 600 dpi in a copy mode. In a send mode, the image processing apparatus allows the user to select one of resolutions of 600 dpi and 300 dpi, and scans an image at the selected resolution. The operation of this image processing apparatus will be explained below taking the send function as an example.

The operation upon scanning at 300 dpi will be described below. When the user inputs a scan instruction at 300 dpi, the image processing apparatus sends a scan image to the scan data file conversion unit 102. When the scan image is sent to the scan data file conversion unit 102, that scan image is input to the block selection unit 204 shown in FIG. 2 as image data, and the block selection unit 204 divides that image into two regions, that is, a text region and background region. The divided text region is sent to the vectorization unit 202, and the background region is sent to the encoding unit 201.

The encoding unit 201 paints the background region in a predetermined color, and compresses that background region by, for example, JPEG. As a result, a JPEG code string is sent to the file configuration unit 203. On the other hand, the text region input to the vectorization unit 202 undergoes vectorization to extract anchor points and also control points required for curve approximation. In this case, the point determination unit 2021 executes function approximation processing using general Bezier curves and the like, and outputs anchor points and control points attached to the anchor points to the file configuration unit 203 (arrow A). The file configuration unit 203 configures a file having independent data storage areas for the text region and background region in accordance with a predetermined format such as PDF or the like, and outputs the file to the hard disk 103.

The operation upon scanning at 600 dpi will be described below. Upon scanning at 600 dpi, the point determination unit 2021 outputs anchor points and the like to the classification unit 2022 (arrow B) unlike scanning at 300 dpi. The processing of the file configuration unit 203 is different from that upon scanning at 300 dpi.

In this embodiment, the classification unit 2022 classifies the output anchor points and attached control points. Also, the classification unit 2022 performs classification in two stages, that is, it classifies anchor points and attached control points with a high importance level in terms of image quality as first priority data, and other anchor points and attached control points as second priority data. The first priority data will also be referred to as a first group hereinafter, and the second priority data will also be referred to as a second group hereinafter.

In this embodiment, upon scanning at the resolution of 300 dpi, the anchor points and attached control points may be classified according to the direction of the processing indicated by arrow B as in the case of the resolution of 600 dpi.

The classification method of anchor points and attached control points in this embodiment will be described below.

Figure 3:
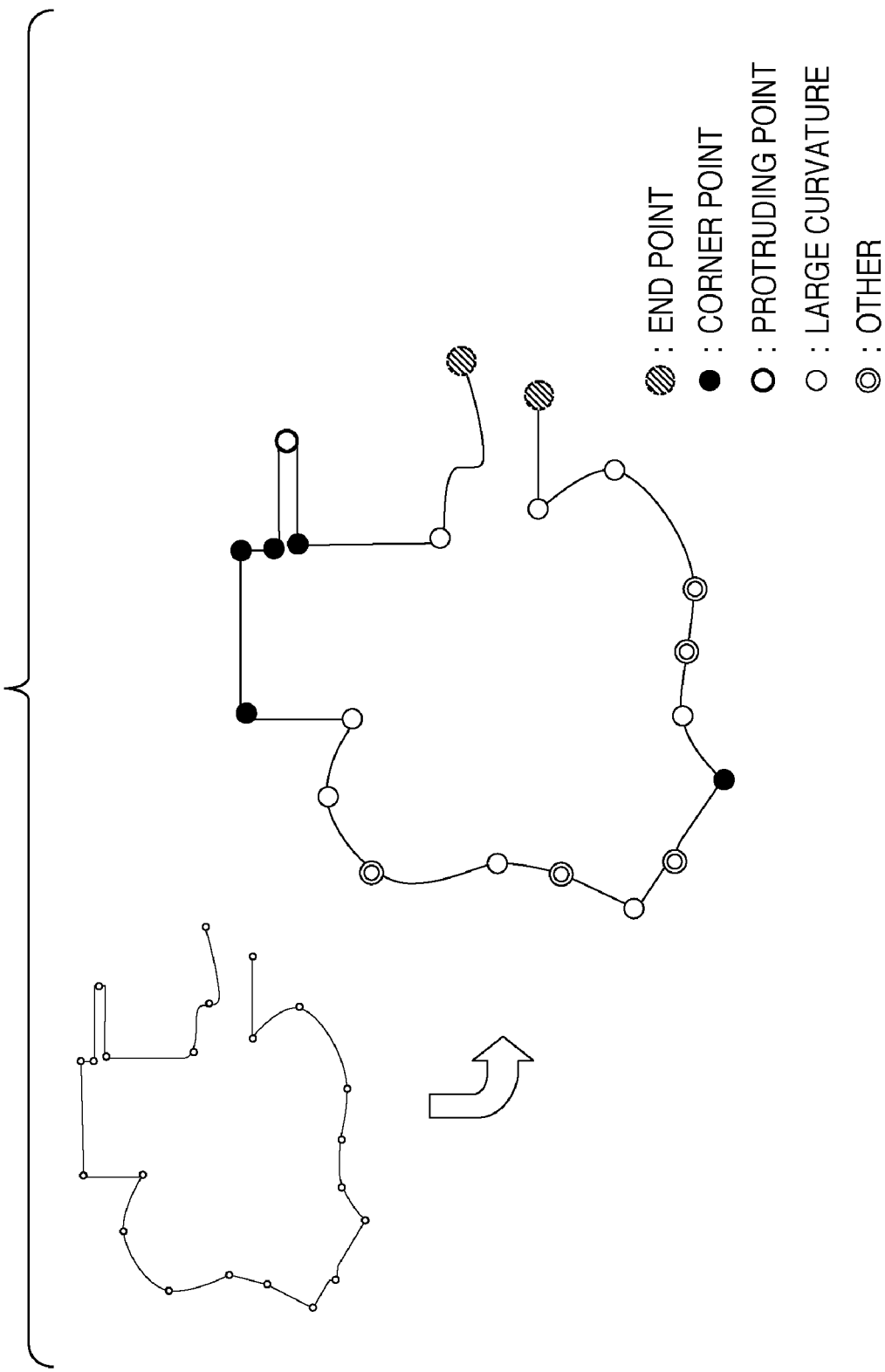
FIG. 3 is a view for explaining classified anchor points.

FIG. 3 is a view for explaining classified anchor points. In this embodiment, it is determined according to the flowchart of FIG. 4 if each anchor point corresponds to one of five types of points, that is, an end point, corner point, protruding point, large-curvature point, and another point. For example, as shown in FIG. 3, an anchor point indicated by a dotted circle is determined as an end point since it is located at an end of an object. An anchor point indicated by a full circle is determined as a corner point since it is located at a corner of the object. An anchor point indicated by a bold circle is determined as a protruding point since it is located at a part having a protruding shape in the object. An anchor point indicated by a thin circle is determined as a large-curvature point since it is located at a part with a maximum curvature of a curve in the object. An anchor point indicated by a double circle is determined as an anchor point which does not belong to the aforementioned four types.

Figure 4:
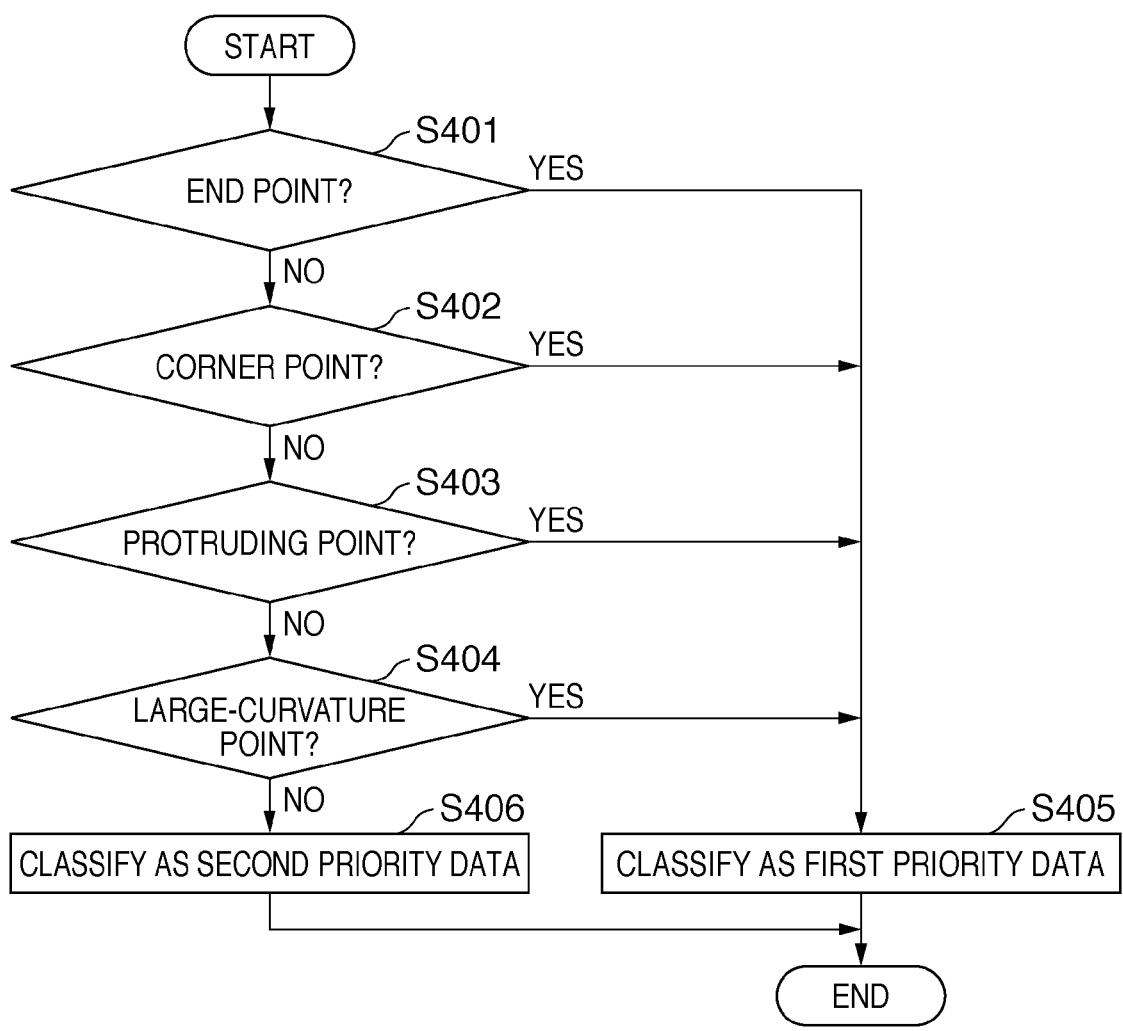
FIG. 4 is a flowchart showing the sequence for classifying anchor points according to the embodiment of the present invention.

FIG. 4 is a flowchart showing the sequence for classifying anchor points according to the embodiment of the present invention. The sequence shown in FIG. 4 will be described below with reference to FIGS. 5 to 11. As a precondition of FIG. 4, the point determination unit 2021 vectorizes an object by a Bezier curve method as a known vectorization method, and extracts anchor points.

In this embodiment, a vector sequence in which anchor points and control points are extracted may be either a cyclic vector sequence obtained by vectorizing the contour of an object or a non-cyclic vector sequence obtained by further processing the periodic vector sequence.

The flowchart of FIG. 4 is applied to an arbitrary one of a plurality of extracted anchor points. It is checked in step S401 if an arbitrarily selected anchor point (to be referred to as an anchor point of interest hereinafter) is an end point. FIG. 5 is a view for explaining a method of determining an anchor point of interest as an end point. As shown in FIG. 5, when a next anchor point (to be also referred to as an adjacent anchor point hereinafter) exists in only one direction, the anchor point of interest is determined as an end point. If it is determined in step S401 in FIG. 4 that the anchor point of interest is an end point, the anchor point of interest is classified as the first priority data (step S405). On the other hand, if it is determined that the anchor point of interest is not an end point, the process advances to step S402.

It is checked in step S402 if the anchor point of interest is a corner point. FIGS. 6A and 6B are views for explaining a method of determining the anchor point of interest as a corner point. FIGS. 6A and 6B show a vector group near the anchor point of interest of the object vectorized by the point determination unit 2021. In this embodiment, when the object is vectorized, it is done in a clockwise direction.

As shown in FIG. 6A, when vectors cross at a right angle to have the anchor point of interest as the center, and the vector lengths that define the right angle are five pixels or more, the anchor point of interest located at the center of the right angle is determined as a corner point. On the other hand, FIG. 6B shows a case in which the anchor point of interest is not determined as a corner point. If it is determined in step S402 in FIG. 4 that the anchor point of interest is a corner point, the anchor point of interest is classified as the first priority data (step S405). On the other hand, if it is determined that the anchor point of interest is not a corner point, the process advances to step S403.

It is checked in step S403 if the anchor point of interest is a protruding point. FIGS. 7A and 7B are views for explaining a method of determining the anchor point of interest as a protruding point. As shown in FIG. 7A, when at least one of adjacent sides has a length 1.5 times or more that of a target side, a shape defined by the target side and adjacent sides is determined as a protruding part, and the anchor point of interest is determined as a protruding point. In FIG. 7A, since the left adjacent side is longer than the 3-pixel length as 1.5 times the 2-pixel length of the target side, the anchor point of interest is determined as a protruding point. On the other hand, FIG. 7B shows a case in which the anchor point of interest is not determined as a protruding point. If it is determined in step S403 in FIG. 4 that the anchor point of interest is a protruding point, the anchor point of interest is classified as the first priority data (step S405). On the other hand, if it is determined that the anchor point of interest is not a protruding point, the process advances to step S404.

Figure 9:
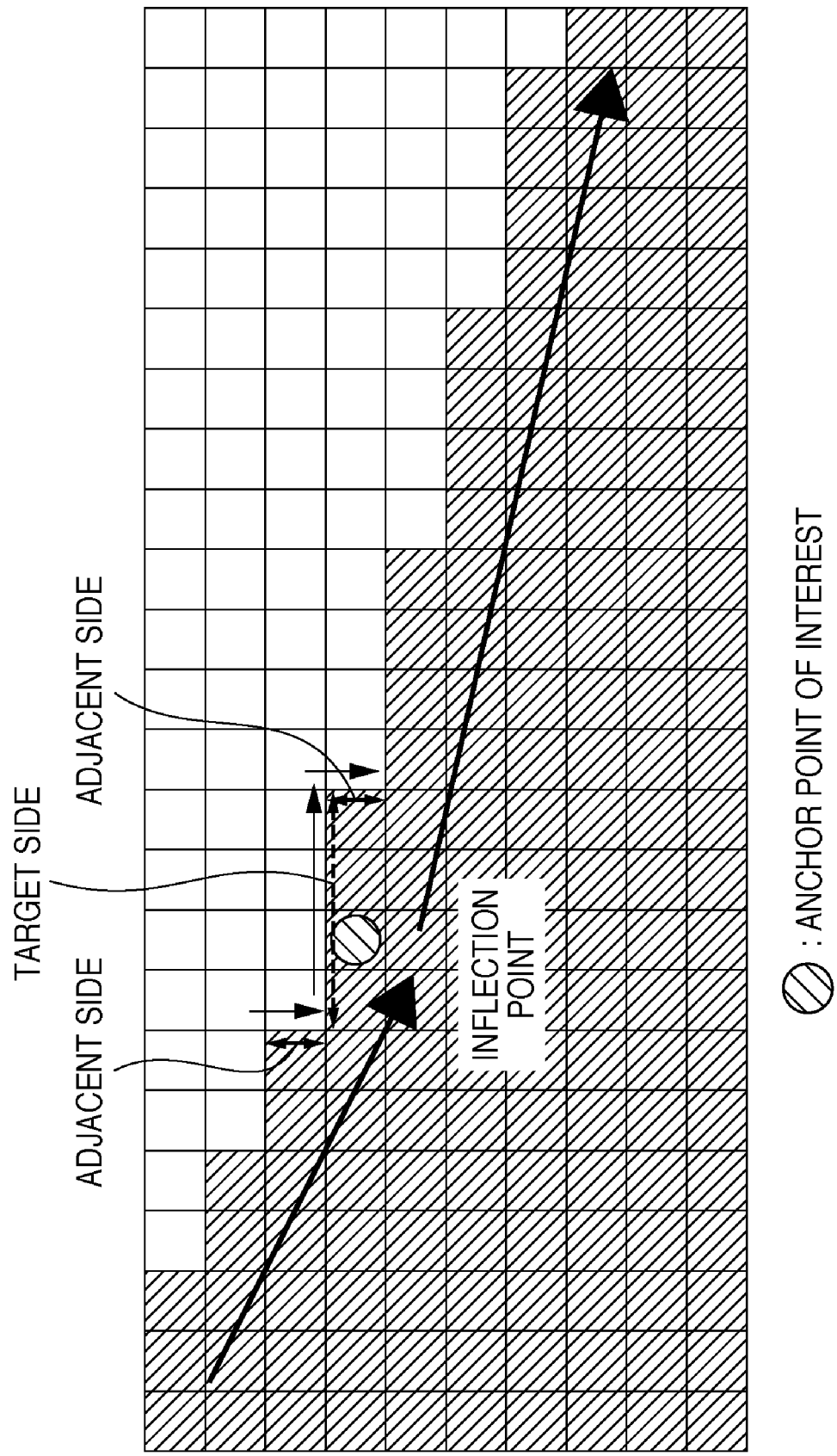
FIG. 9 is a view showing an example in which an anchor point of interest is classified to a second priority group.

It is checked in step S404 if the anchor point of interest is a large-curvature point. FIG. 8 is a flowchart for explaining a method of determining the anchor point of interest as a large-curvature point. As shown in FIG. 8, it is checked in step S801 if the directions of vectors of adjacent sides agree with each other. If it is determined that the directions of the vectors of the adjacent sides agree with each other, it is determined that the curvature at the anchor point of interest is small, and the anchor point of interest is classified as the second priority data (step S406). FIG. 9 shows an example in which the anchor point of interest is classified as the second priority group. As shown in FIG. 9, since the directions of the vectors of the adjacent sides agree with each other, the anchor point of interest is determined not as a large-curvature point but as an inflection point, and is classified as the second priority data. If it is determined in step S801 that the directions of the vectors of the adjacent sides are different from each other, the process advances to step S802. In step S802, the lengths of the target side and second adjacent sides are compared. FIG. 10 is a view for explaining comparison between the lengths of the target side and second adjacent sides. As shown in FIG. 10, when ½ of the total of the lengths of second adjacent sides a and b is larger than a length x of the target side, it is determined in step S802 that the target side is shorter than the second adjacent sides. In this case, the anchor point of interest is classified as the second priority data (S406). FIG. 11 is another view for explaining comparison between the lengths of the target side and second adjacent sides. As shown in FIG. 11, if ½ of the total of the lengths of second adjacent sides a and b is smaller than the length x of the target side, it is determined in step S802 that the target side is longer than the second adjacent sides. In this case, the anchor point of interest is determined as a large-curvature point (to be also referred to as a curvature point hereinafter), and is classified as the first priority data (step S405). The value of ½ of the total of the lengths of the second adjacent sides a and b may be stored in advance in a storage area such as a memory or the like in the image processing apparatus as a reference curvature.

After the anchor points of interest and attached control points are classified as the first or second priority data according to the flowchart shown in FIG. 4, the image processing apparatus repeats the determination processes shown in FIG. 4 to have other anchor points as anchor points of interest. The image processing apparatus executes the determination processes shown in FIG. 4 for all anchor points extracted from the vectorized object. The anchor points classified as the first or second priority data are output to the file configuration unit 203 shown in FIG. 2.

FIG. 12 shows the data configuration of a file generated by the file configuration unit 203. As shown in FIG. 12, the file includes a first priority data storage area, second priority data storage area, and compressed data storage area. The first priority data storage area stores the anchor points and attached control points classified as the first priority data in FIG. 4. The second priority data storage area stores the anchor points and attached control points classified as the second priority data in FIG. 4. The compressed data storage area stores the background region compressed by the encoding unit 201. In FIG. 12, the first priority data storage area is stored from the head of the file. However, the present invention is not particularly limited to the configuration shown in FIG. 12 as long as the first and second priority data storage areas are distinguished from each other.

The file configured as shown in FIG. 12 is stored in the hard disk 103. As has already been described above, the anchor points and attached control points stored in the first priority data storage area are any of the end point, corner point, protruding point, and large-curvature point of the object. Therefore, when the output file generation unit 104 reads out the data stored in the first priority data storage area, the image processing apparatus can render a sketch (a rough contour) of the object. A CPU or the like of the image processing apparatus need only recognize the start and end addresses of the first priority data storage area when it reads out data stored in that area. Therefore, the read-out processing of data required to render a sketch (a rough contour) of the object can be simplified and speeded up.

For example, assume that the user inputs a print instruction of the file shown in FIG. 12 saved in the hard disk 103 via an interface (not shown). In this case, the output file generation unit 104 reads out all data included in the file shown in FIG.

12 from the hard disk 103, and sends them to the output unit 105. The output unit 105 prints a received image.

Also, assume that the user gives the instruction for the send function about data required to render a sketch via an interface (not shown). In this case, the output file generation unit 104 reads out the file shown in FIG. 12 saved in the hard disk 103. The output file generation unit 104 extracts only the first priority data stored in the first priority data storage area and the compressed data stored in the compressed data storage area, and sends them to the output unit 105. The output unit 105 sends the first priority data and compressed data, which are converted into, for example, a PDF file or the like to a host computer as a destination designated by the user.

As described above, in this embodiment, in the file stored in the hard disk 103, the areas that store the anchor points and attached control points are classified as the first and second priority data storage areas to have a hierarchical structure. Also, the areas for respective classes like the first and second priority data storage areas are identifiable by means of their addresses and the like. As a result, the processing which controls the output file generation unit 104 to extract some data of the file stored in the hard disk 103 and to render a sketch of an object can be simplified and speeded up.

In this embodiment, since the anchor points are classified and saved, whether only the first priority data are used or both the first and second priority data are used can be switched according to the purpose of processing. For example, when a sketch of an object need only be rendered, when a high processing speed is required, or when data are to be output while reducing their size, only the first priority data are used. When an object is to be rendered with higher precision, both the first and second priority data can be used.

FIGS. 13A and 13B show anchor points and attached control points to be classified. FIG. 13A shows anchor points and attached control points to be stored in a file in a conventional apparatus. In the conventional apparatus, anchor points A, B, and C, and control points a', b', c1', and c2', which define Bezier curve 1, are stored in a file. It is generally known that anchor points are points through which a curve passes, and control points are used to determine the curvature of a curve.

On the other hand, in this embodiment, the anchor points and attached control points which define Bezier curve 1 are classified as the first and second priority data, as shown in FIG. 13B. Assume that anchor points A and B shown in FIGS. 13A and 13B are classified as end points on the contour of an object. Also, assume that anchor point C is that which is classified as the second priority data in FIG. 4. Therefore, as shown in FIG. 13B, anchor points A and B are classified as the first priority data, and anchor point C is classified as the second priority data.

Classification of control points will be described below. As shown in FIG. 13B, control points a' and b', and control points c1' and c2' attached to the anchor point C are classified as the second priority data. In this case, assuming that anchor points A and B, and control points a and b are classified as the first priority data, and a sketch of an object is rendered using only the first priority data, the rendered object has lower image quality than original Bezier curve 1. This is generally due to a nature that the gradient of a curve increases as a control point is separated farther away from a baseline that couples anchor points, and it decreases as the control point is closer to the baseline. Therefore, in this embodiment, control points a and b are attached to anchor points A and B classified as the first priority data. In this case, as shown in FIG. 13B, control points a and b are set in directions to be separated away from the baseline. As a result, a shape close to original Bezier curve 1 can be reproduced, and an image quality drop can be prevented upon classifying anchor points and control points and rendering a sketch of an object.

Upon rendering an object also using the second priority data, control points a' and b' before introduction of the hierarchical structure of the first and second priority data are used in place of control points a and b.

Figure 14:
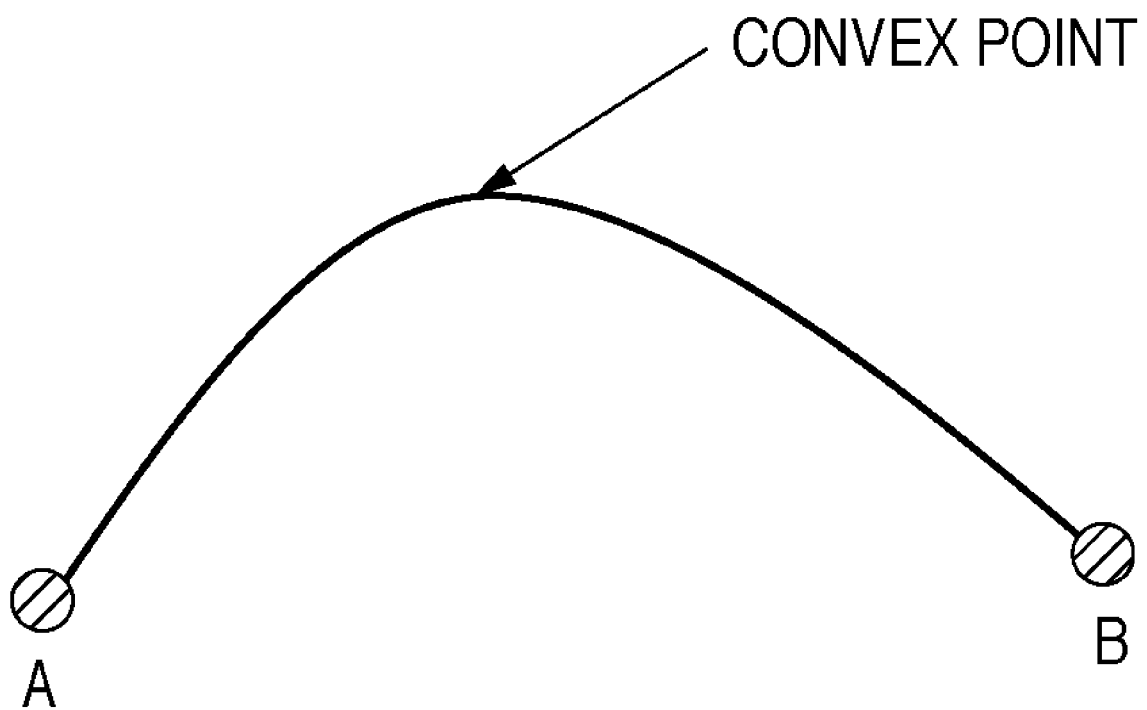
FIG. 14 is a view for explaining another example of classification of anchor points and control points in this embodiment.

Another example of this embodiment will be described below. FIG. 14 is a view for explaining another example of classification of anchor points and control points. In the example shown in FIG. 13B, anchor point C and attached control points c1' and c2' are output from the point determination unit 2021, are sent to the file configuration unit 203 as the second priority data, and are stored in the file. However, in this example, anchor point C is not sent to the file configuration unit 203. As a result, in this example, the first priority data storage area of the file stores anchor points A and B and attached control points a and b, and the second priority data storage area stores control points a' and b'.

In this example, a sketch of an object is rendered using the first priority data as in FIG. 13B. On the other hand, upon rendering an object by reading out the first and second priority data, the coordinate position of a convex point on a curve between anchor points A and B is determined as anchor point C upon rendering the first priority data. Furthermore, the object is rendered using control points a' and b' stored in the second priority data storage area, and control points c1' and c2' attached to determined anchor point C. Anchor point C of this example may be determined by, for example, the file configuration unit 203.

As described above, in this example, since anchor point C of the second priority data is automatically determined upon rendering the first priority data, anchor point C need not be stored in the second priority data area of the file shown in FIG. 12. As a result, compared to the related art that stores seven points shown in FIG. 13A, the data size to be stored in the file can be reduced to that for six points, thus preventing an increase in file size upon classifying anchor points and control points in this embodiment.

In this example, anchor point C as the second priority data determined by the file configuration unit 203 is defined as the coordinate position of a convex point on the curve between anchor points A and B, but it need not always be defined as a convex point. For example, the position, that is, the coordinates, of a predetermined inflection point on the curve may be determined as anchor point C.

In this example, since only anchor points A and B are stored in the file, after the file configuration unit 203 calculates anchor point C as the second priority data, it may further calculate new anchor point D. For example, in this case, anchor point D may be determined as a convex point between anchor points A and C. Furthermore, determined anchor point D may be classified as third priority data to add another layer to the data configuration of the file shown in FIG. 12.

Still another example of this embodiment will be described below. In this example, anchor points A and B and control points a and b are stored in the file as the first priority data, as in FIG. 13B. Also, anchor point C, and control points a', b', c1', and c2' are stored in the file as the second priority data. In this example, the coordinate value of control point a is determined so that the slope of tangent Aa in the first priority data matches that of tangent Aa' in the second priority data. Likewise, the coordinate value of control point b is determined so that the slope of tangent Bb in the first priority data matches that of tangent Bb' in the second priority data. Therefore, the coordinate values of control points a' and b' stored in the second priority data storage area can be either one of x- and y-coordinate values (in case of an x-y orthogonal coordinate system).

Therefore, in this example, the data size can be reduced compared to the example shown in FIG. 13B, thus suppressing an increase in file size upon classifying anchor points and control points in this embodiment.

In this embodiment, the Bezier curve method is used as the vectorization method, but other methods that approximate the contour of an object in an image may be used. The JPEG method is used as the image compression method, but other image compression methods may be used. Furthermore, a character is selected as an object to be vectorized, but a graph, clipart, or the like may be selected as an object to be vectorized.

The present invention also includes a case in which an operating system (OS) or the like, which runs on a computer, executes some or all of actual processes based on an instruction of a program code (image processing program), thereby implementing the functions of the aforementioned embodiment. Furthermore, the present invention can also be applied to a case in which a program code read out from a storage medium is written in a memory equipped on a function expansion card or function expansion unit which is inserted into or connected to a computer. In this case, a CPU or the like equipped on the function expansion card or unit executes some or all of actual processes based on an instruction of the written program code, thereby implementing the functions of the aforementioned embodiment.

For example, a computer (CPU or MPU) of a system or apparatus may read out and execute a program code stored in a computer-readable program recording medium such as a memory or the like. In this case, the program code itself read out from the program recording medium implements the functions of the aforementioned embodiment, and the recording medium that records the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-238386 filed Sep. 13, 2007, which is hereby incorporated by reference herein in its entirety.

What is claimed is:

1. An image processing apparatus, which generates image data by functionally approximating a contour of an object using anchor points and control points, and processes the image data, comprising:
   a classification unit configured to classify the anchor points that define the contour of the object into a plurality of groups based on features of the contour of the object, wherein said classification unit classifies the anchor points into a first group including anchor points which meet one of the features of the contour of the object and a second group including anchor points which do not meet any of the features of the contour of the object;
   a saving unit configured to save the anchor points classified by said classification unit for the first group, wherein said saving unit does not save the anchor points classified into the second group; and
   an output unit configured to execute rendering using the anchor points classified into the first group and an anchor point which is located on a curve determined by the anchor points classified into the first group and is classified as the second group, and outputs a rendered result as the object.

2. The apparatus according to claim 1, wherein said classification unit further generates control points attached to the anchor points.

3. The apparatus according to claim 1, wherein the features of the contour of the object include at least one of:
   an end point on the contour of the object;
   a corner point located at a corner on the contour of the object;
   a protruding point located at a protruding part on the contour of the object; and
   a curvature point having a reference curvature on a curve that connects two adjacent anchor points.

4. The apparatus according to claim 3, wherein the end point is the anchor point having one adjacent anchor point.

5. An image processing apparatus which generates image data by functionally approximating a contour of an object using anchor points and control points, and processes the image data, comprising:
   a classification unit configured to classify the anchor points that define the contour of the object into a plurality of groups based on features of the contour of the object; and
   a saving unit configured to save the anchor points classified by said classification unit for respective groups,
   wherein the features of the contour of the object include a corner point located at a corner on the contour of the object, and
   wherein the corner point is the anchor point which is located at a center of a right angle which is defined by vectors having lengths of not less than 5 pixels.

6. An image processing apparatus which generates image data by functionally approximating a contour of an object using anchor points and control points, and processes the image data, comprising:
   a classification unit configured to classify the anchor points that define the contour of the object into a plurality of groups based on features of the contour of the object; and
   a saving unit configured to save the anchor points classified by said classification unit for respective groups,
   wherein the features of the contour of the object include a protruding point located at a protruding part on the contour of the object, and the protruding point is the anchor point which is located on a target side when at least one of two adjacent sides which are adjacent to the target side on the contour of the object has a length not less than 1.5 times of a length of the target side.

7. An image processing apparatus which generates image data by functionally approximating a contour of an object using anchor points and control points, and processes the image data, comprising:
   a classification unit configured to classify the anchor points that define the contour of the object into a plurality of groups based on features of the contour of the object; and
   a saving unit configured to save the anchor points classified by said classification unit for respective groups,
   wherein the features of the contour of the object include a curvature point having a reference curvature on a curve that connects two adjacent anchor points, and the curvature point is the anchor point which is located on a target side, when directions of vectors of two adjacent sides which are adjacent to the target side on the contour of the object are different from each other, and ½ of a total of lengths of two second adjacent sides which are further adjacent to the adjacent sides adjacent to the target side is smaller than a length of the target side.

8. The apparatus according to claim 1, wherein when a sketch of the object is rendered, the anchor points classified into the first group are used.

9. An image processing apparatus, which generates image data by functionally approximating a contour of an object using anchor points and control points, and processes the image data, comprising:
a classification unit configured to classify the anchor points that define the contour of the object into a plurality of groups based on features of the contour of the object, wherein said classification unit classifies the anchor points into a first group including anchor points which meet one of the features of the contour of the object and a second group including anchor points which do not meet any of the features of the contour of the object, and wherein the control points attached to the anchor points classified into the first group are classified into the second group; and
a saving unit configured to save the anchor points classified by said classification unit for respective groups,
wherein said saving unit saves either one of an x-coordinate value and a y-coordinate value of each control point on an x-y orthogonal coordinate system.

10. An image processing method, which generates image data by functionally approximating a contour of an object using anchor points and control points, and processes the image data, comprising:
a classification step of classifying the anchor points that define the contour of the object into a plurality of groups based on features of the contour of the object, wherein said classification step classifies the anchor points into a first group including anchor points which meet one of the features of the contour of the object and a second group including anchor points which do not meet any of the features of the contour of the object;
a saving step of saving the anchor points classified in the classification step for the first group, wherein said saving unit does not save the anchor points classified into the second group; and
an output step configured to execute rendering using the anchor points classified into the first group and an anchor point which is located on a curve determined by the anchor points classified into the first group and is classified as the second group, and outputs a rendered result as the object.

11. A non-transitory computer-readable recording medium recording an image processing program, which generates image data by functionally approximating a contour of an object using anchor points and control points, and processes the image data, said program making a computer function to:
classify the anchor points that define the contour of the object into a plurality of groups based on features of the contour of the object, wherein said contour of the object classifies the anchor points into a first group including anchor points which meet one of the features of the contour of the object and a second group including anchor points which do not meet any of the features of the contour of the object;
a contour of the object to save the classified anchor points for the first group wherein said contour of the object does not save the anchor points classified into the second group; and
a contour of the object configured to execute rendering using the anchor points classified into the first group and an anchor point which is located on a curve determined by the anchor points classified into the first group and is classified as the second group, and outputs a rendered result as the object.

12. An image processing method of generating image data by functionally approximating a contour of an object using anchor points and control points, and processes the image data, comprising:
classifying the anchor points that define the contour of the object into a plurality of groups based on features of the contour of the object; and
saving the classified anchor points for respective groups,
wherein the features of the contour of the object include a corner point located at a corner on the contour of the object and the corner point is the anchor point which is located at a center of a right angle which is defined by vectors having lengths of not less than 5 pixels.

13. An image processing method of generating image data by functionally approximating a contour of an object using anchor points and control points, and processes the image data, comprising:
classifying the anchor points that define the contour of the object into a plurality of groups based on features of the contour of the object; and
saving the classified anchor points for respective groups,
wherein the features of the contour of the object include a protruding point located at a protruding part on the contour of the object, and wherein the protruding point is the anchor point which is located on a target side when at least one of two adjacent sides which are adjacent to the target side on the contour of the object has a length not less than 1.5 times of a length of the target side.

14. An image processing method of generating image data by functionally approximating a contour of an object using anchor points and control points, and processes the image data, comprising:
classifying the anchor points that define the contour of the object into a plurality of groups based on features of the contour of the object; and
saving the classified anchor points for respective groups,
wherein the features of the contour of the object include a curvature point having a reference curvature on a curve that connects two adjacent anchor points and the curvature point is the anchor point which is located on a target side, when directions of vectors of two adjacent sides which are adjacent to the target side on the contour of the object are different from each other, and ½ of a total of lengths of two second adjacent sides which are further adjacent to the adjacent sides adjacent to the target side is smaller than a length of the target side.

15. An image processing method of generating image data by functionally approximating a contour of an object using anchor points and control points, and processes the image data, comprising:
classifying the anchor points that define the contour of the object into a plurality of groups based on features of the contour of the object, wherein said classification unit classifies the anchor points into a first group including anchor points which meet one of the features of the contour of the object and a second group including anchor points which do not meet any of the features of the contour of the object, and wherein the control points attached to the anchor points classified into the first group are classified into the second group; and
saving the classified anchor points for respective groups, such that either one of an x-coordinate value and a y-coordinate value of each control point on an x-y orthogonal coordinate system.

16. A non-transitory computer-readable recording medium recording an image processing program, which generates image data by functionally approximating a contour of an object using anchor points and control points, and processes the image data, said program making a computer function to:
- classifying the anchor points that define the contour of the object into a plurality of groups based on features of the contour of the object; and
- saving the classified anchor points for respective groups,
- wherein the features of the contour of the object include a corner point located at a corner on the contour of the object and the corner point is the anchor point which is located at a center of a right angle which is defined by vectors having lengths of not less than 5 pixels.

17. A non-transitory computer-readable recording medium recording an image processing program, which generates image data by functionally approximating a contour of an object using anchor points and control points, and processes the image data, said program making a computer function to:
- classifying the anchor points that define the contour of the object into a plurality of groups based on features of the contour of the object; and
- saving the classified anchor points for respective groups,
- wherein the features of the contour of the object include a protruding point located at a protruding part on the contour of the object and the protruding point is the anchor point which is located on a target side when at least one of two adjacent sides which are adjacent to the target side on the contour of the object has a length not less than 1.5 times of a length of the target side.

18. A non-transitory computer-readable recording medium recording an image processing program, which generates image data by functionally approximating a contour of an object using anchor points and control points, and processes the image data, said program making a computer function to:
- classifying the anchor points that define the contour of the object into a plurality of groups based on features of the contour of the object; and
- saving the classified anchor points for respective groups,
- wherein the features of the contour of the object include a curvature point having a reference curvature on a curve that connects two adjacent anchor points and the curvature point is the anchor point which is located on a target side, when directions of vectors of two adjacent sides which are adjacent to the target side on the contour of the object are different from each other, and ½ of a total of lengths of two second adjacent sides which are further adjacent to the adjacent sides adjacent to the target side is smaller than a length of the target side.

19. A non-transitory computer-readable recording medium recording an image processing program, which generates image data by functionally approximating a contour of an object using anchor points and control points, and processes the image data, said program making a computer function to:
- classifying the anchor points that define the contour of the object into a plurality of groups based on features of the contour of the object, wherein said classification unit classifies the anchor points into a first group including anchor points which meet one of the features of the contour of the object and a second group including anchor points which do not meet any of the features of the contour of the object, and wherein the control points attached to the anchor points classified into the first group are classified into the second group; and
- saving the classified anchor points for respective groups, such that either one of an x-coordinate value and a y-coordinate value of each control point on an x-y orthogonal coordinate system.

* * * * *